US009929528B2

(12) United States Patent
Magnano et al.

(10) Patent No.: US 9,929,528 B2
(45) Date of Patent: Mar. 27, 2018

(54) LASER SOURCE, PARTICULARLY FOR INDUSTRIAL PROCESSES

(71) Applicants: Comau S.p.A., Grugliasco (Turin) (IT); Prima Electro S.p.A., Moncalieri (Turin) (IT)

(72) Inventors: Nunzio Magnano, Grugliasco (IT); Maurizio Gattiglio, Moncalieri (IT)

(73) Assignees: Comau S.p.A., Grugliasco (Turin) (IT); Prima Electro S.p.A., Moncalieri (Turin) (IT)

( * ) Notice: Subject to any disclaimer, the term of this patent is extended or adjusted under 35 U.S.C. 154(b) by 0 days.

(21) Appl. No.: 15/512,207

(22) PCT Filed: Sep. 22, 2015

(86) PCT No.: PCT/IB2015/057282
§ 371 (c)(1),
(2) Date: Mar. 17, 2017

(87) PCT Pub. No.: WO2016/046735
PCT Pub. Date: Mar. 31, 2016

(65) Prior Publication Data
US 2017/0288363 A1 Oct. 5, 2017

(30) Foreign Application Priority Data
Sep. 26, 2014 (IT) .............................. TO2014A0766

(51) Int. Cl.
*H01S 3/067* (2006.01)
*H01S 3/23* (2006.01)
(Continued)

(52) U.S. Cl.
CPC ........ *H01S 3/06754* (2013.01); *H01S 3/0071* (2013.01); *H01S 3/086* (2013.01);
(Continued)

(58) Field of Classification Search
CPC ........ H01S 3/067; H01S 3/23; H01S 3/08059; H01S 3/2383; H01S 3/086; H01S 3/0941; H01S 3/094
(Continued)

(56) References Cited

U.S. PATENT DOCUMENTS

2008/0253419 A1* 10/2008 Feklistov ................ H01S 3/005
372/38.03
2014/0177038 A1* 6/2014 Rrataj ................ H01S 3/10015
359/341.1

FOREIGN PATENT DOCUMENTS

EP 1848073 A1 10/2007
WO 2010083566 A2 7/2010

* cited by examiner

*Primary Examiner* — Tuan Nguyen
(74) *Attorney, Agent, or Firm* — Young Basile Hanlon & MacFarlane, P.C.

(57) ABSTRACT

A laser source for use in providing a laser beam for industrial operations in an industrial plant. The laser source selectively providing a first laser beam at a first outlet having relatively high power and lower beam quality and a second laser beam at a second outlet having relatively lower power and higher beam quality. The laser source including an optical path selector device for selectively transmitting a first laser beam along a first or second optical line toward respective first and second outlets. The second optical path having an optical amplification unit for changing the first laser to the second laser. An industrial plant including at least a first laser source selectively controls the first laser source to provide the first and the second lasers to predetermined laser processing stations. A second laser source may be used and controlled to provide a first or second laser to an alternate laser processing station on a failure of another laser source.

19 Claims, 5 Drawing Sheets

(51) Int. Cl.
*H01S 3/08* (2006.01)
*H01S 3/086* (2006.01)
*H01S 3/0941* (2006.01)
*H01S 3/00* (2006.01)

(52) U.S. Cl.
CPC ........ *H01S 3/08059* (2013.01); *H01S 3/0941* (2013.01); *H01S 3/2308* (2013.01); *H01S 3/2383* (2013.01); *H01S 3/2391* (2013.01); *H01S 3/005* (2013.01)

(58) Field of Classification Search
USPC .......................................................... 372/6
See application file for complete search history.

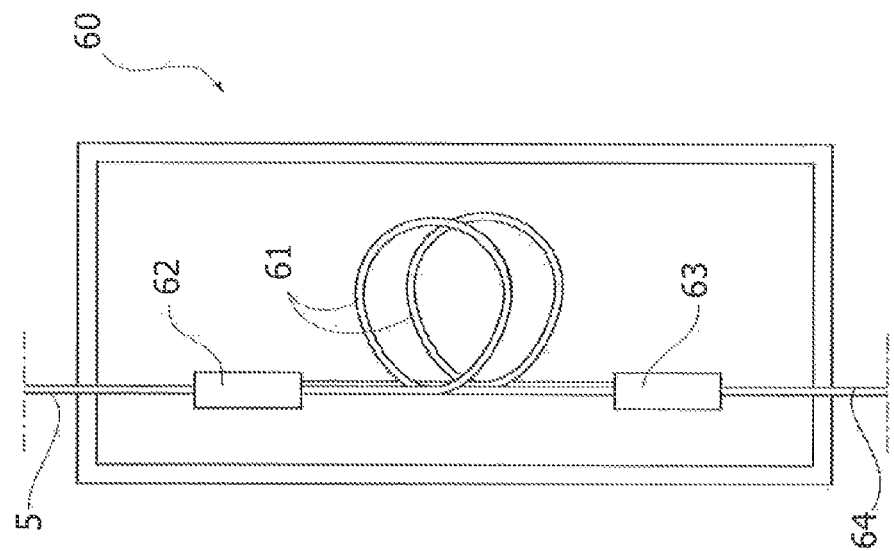
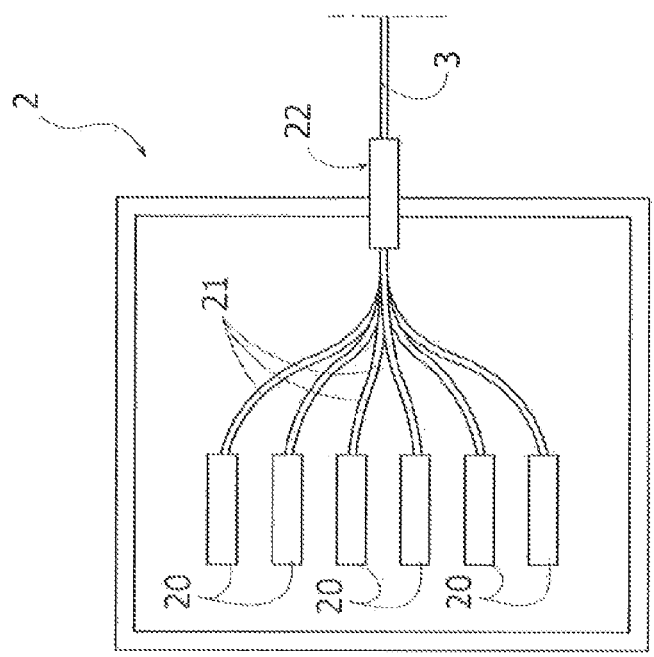

LASER SOURCE, PARTICULARLY FOR INDUSTRIAL PROCESSES

TECHNICAL FIELD

The present invention relates to laser sources and in particular to laser sources of the type adapted for industrial processes, such as welding, brazing and cutting operations on metal materials.

BACKGROUND

Many kinds of laser sources have been developed in the past and are presently available in the market in order to satisfy various needs in the field of industrial processes and in particular in the field of processes on metal materials. In general, different processes (such as welding, brazing and cutting of metal materials), different degrees of precision in the process and different characteristics of the materials being processed (such as a different values of the thickness of a metal sheet to be welded or to be cut) require different characteristics of the laser beam in order to ensure optimum results. For some of these processes, the quality level of the laser beam may be lower, whereas for other applications the quality of the beam must be higher.

In the present description, and in the following claims, by the term "quality" of the laser beam means the ability of the laser beam to be focused into a very small spot, so as to give rise to a high power density at the laser spot. The quality of the laser beam defined in this manner is commonly represented by the value of a parameter called BPP ("Beam Parameter Product"), measured in millimeters per milliradiant (mm.mrad) corresponding to the product of one half of the divergence angle of the laser beam by the beam diameter at its narrowest portion (beam waist). The quality of the laser beam is higher when the value of BPP is lower. Therefore, different industrial applications may require the use of laser beams with values of the BPP parameter much different from each other. Similarly, also the power of the laser beam may be varied, as a function of the specific applications.

In many laser sources of known type, it is possible to vary the quality and the power of the laser beam to a very limited extent, with no possibility however of modifying the characteristics of the laser beam significantly. For this reason, at present it is often necessary to use different laser sources for performing different industrial operations.

On the other hand, it would be desirable to have a single "universal" laser source, which may be easily adapted depending upon the nature of the industrial operation to be performed and/or the nature of the materials to be processed.

Among the various types of laser sources which have been already developed and are presently available on the market, diode laser sources and laser sources with active optical fibres are worth to be mentioned here in particular. The latter type comprises optical fibres in which an "active" material is dispersed (typically a rare earth material) which has the ability of amplifying a light beam by exploiting the principle of stimulated emission. Typically the active optical fibre is "pumped" with a laser beam generated by a diode laser source. In general, sources with active optical fibres generate a higher quality of the beam with respect to diode laser sources, while causing a loss of power due to the dispersions within the optical fibre.

FIG. 3 of US 2014/0177038 shows a laser device with dual brilliance, having a fibre-integrated optical beam switch, able to switch the laser beam between two optical fibres, one of which is connected to a first outlet, the other optical fibre being connected to an ytterbium fibre oscillator, which provides a fibre output with a radiation having a higher brilliance.

SUMMARY

The object of the present invention is that of providing a laser source able of selectively generating laser beams with characteristics which are significantly different from each other, so that it can be used in industrial applications which are also much different from each other.

A further object of the present invention is that of achieving this purpose with a laser source having a simple and efficient structure. A further object is that of providing a system with a plurality of devices, cells or stations for laser processes, which make use of one or more laser sources of the above indicated type in an advantageous and efficient manner.

In view of achieving these objects, the present invention provides a laser source comprising:
  a laser beam generating unit, including one or more diode laser sources, for generating a first laser beam,
  an optical amplification unit, including at least one amplifier module adapted to receive laser light derived from said first laser beam emitted by said generating unit and to emit a second laser beam at its output having a higher beam quality and a lower power value with respect to said first laser beam coming from said generating unit, and
  a laser beam switching and addressing optical unit, interposed between said generating unit and said optical amplification unit, said switching and addressing optical unit including:
  an inlet for receiving said first laser beam coming from said generating unit,
  a first optical line for forwarding said first laser beam to a first outlet of said laser source,
  a second optical line for forwarding said first laser beam towards said at least one amplifier module of said optical amplification unit, and
  an optical path selector device interposed between said inlet and said first and second optical lines, for directing said first laser beam coming from said generating unit selectively towards:
  said first optical line, so as to generate the emission of a laser beam of a relatively higher power and a relatively lower quality at said first outlet of said laser source, or towards
  said second optical line, so as to generate the emission of a laser beam having a relatively lower power and a relatively higher quality at a second outlet of said laser source.

Preferably, said optical amplification unit includes a plurality of amplifier modules arranged in parallel, having respective inlets supplied in parallel by said second optical line and respective outlets connected to optical lines converging towards said second outlet.

Due to the above indicated features, the invention provides a single laser source which has a first outlet and a second outlet separated from each other, which are selectively activated for emitting laser beams having characteristics which differ significantly, depending upon the specific application of interest.

It is thus possible, for example, to implement a process cell in an industrial plant having a single laser source for performing at this cell processes of different nature within a same working cycle and/or in order to enable a future introduction of a new working cycle within the same cell, without requiring a replacement of the laser source and/or in order to use the same laser source for example for performing different processes at a same working cell or for performing different processes in different working cells, or for acting as dedicated source at a first working cell and as a back-up source at another working cell.

According to a preferred embodiment, the above mentioned laser's beam generating unit is a unit comprising a plurality of diode laser sources, as already indicated above, whereas each amplifier module of said optical amplification unit comprise at least one active optical fibre, of the type containing an active material (such as ytterbium) able of amplifying the laser beam which enters into said module, coming from said generating unit through said second optical line of said switching and addressing optical unit.

Also in the case of the above mentioned preferred embodiment, said optical path selector device is preferably constituted by a mirror movable between a first operative position and a second operative position in which the laser beam coming from said generating unit is directed respectively towards said first optical line and towards said second optical line. In a first solution, the mirror does not intercept the laser beam coming from the generating unit when it is at its first operative position, thereby enabling the laser beam of proceeding further towards the first optical line, whereas in its second operative position the mirror intercepts the laser beam and reflects the same towards the second optical line. In one variant, the mirror intercepts the laser beam in both its operative positions but assumes different orientations at said positions, so as to reflect the laser beam respectively towards said first optical line and towards said second optical line.

The movement of the optical path selecting mirror is controlled by an actuator device of any known type, preferably having electric actuation.

BRIEF DESCRIPTION OF THE DRAWINGS

Further features and advantages of the present invention will became apparent from the description which follows with reference to the annexed drawings, given purely by way of non limiting example, in which:

FIG. 3 is an alternate enlarged portion of FIG. 1;

FIG. 4 is an alternate enlarged portion of FIG. 1 showing an example of an active optical fibre and Bragg recticles inside of an exemplary amplifier module;

DETAILED DESCRIPTION

Figure 1:
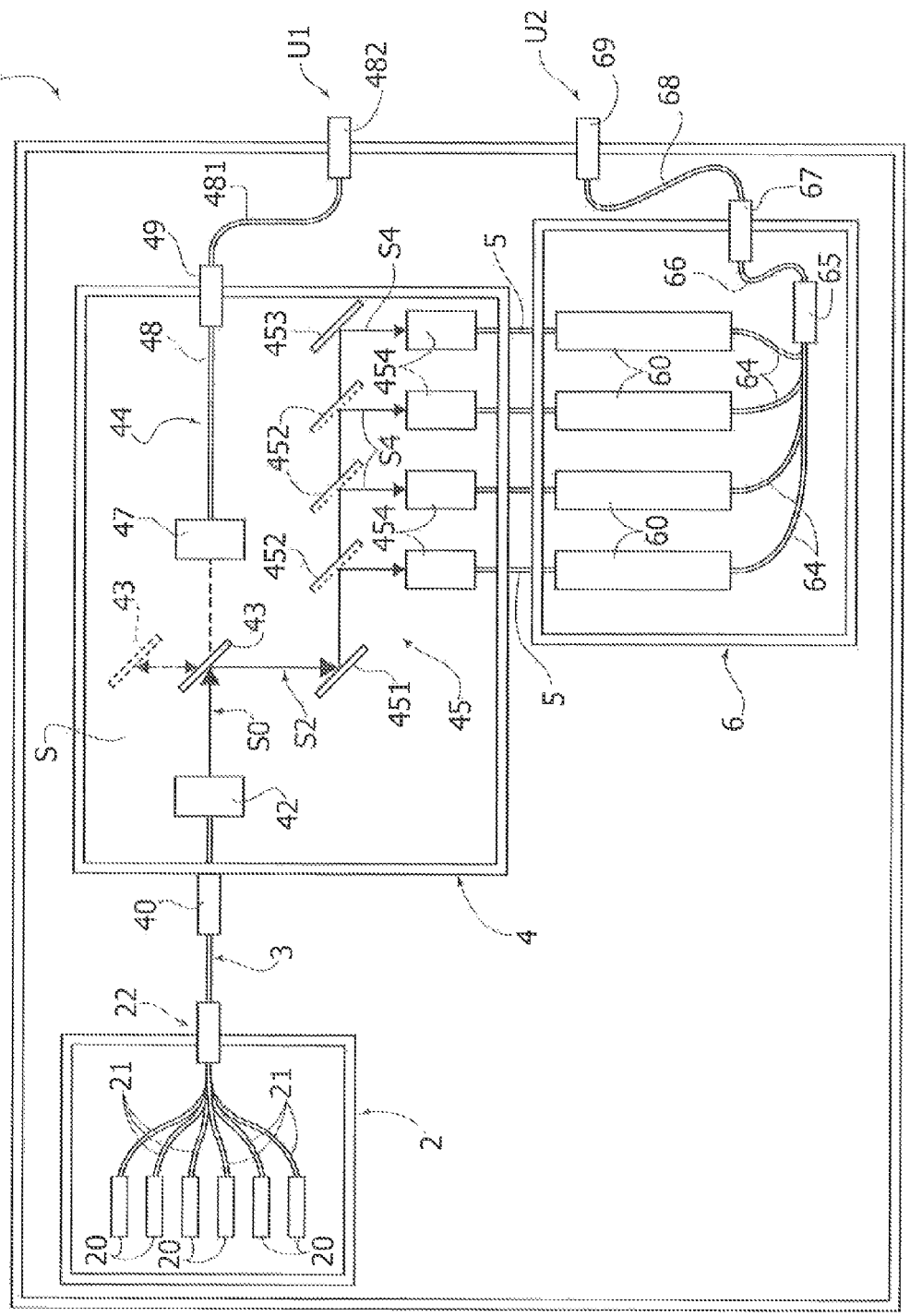
FIG. 1 is a diagram of an exemplary embodiment of a laser source according to the present invention.

With reference to the drawings, numeral 1 generally designates a laser source for use in industrial processes, in particular on metal materials. The laser source illustrated herein can be used for example in an industrial cell in which operations of various types are performed, such as laser welding operations, laser brazing operations and/or laser cutting operations.

Many of the components forming part of the embodiment described herein are shown in the annexed drawings only diagrammatically, since each of them, taken alone, can be made in any known way. The deletion of these details of construction from the drawings renders also the latter simpler and easier to understand.

According to the invention, the laser source 1 comprises a laser beam generating unit, generally indicated by reference numeral 2. The generating unit 2 comprises a plurality of diode laser sources 20 constituted in any known way. The laser light coming out from the diode laser sources 20 is guided into optical fibres 21 which merge into a fibre combiner 22, which is also of a type known per se, whose output is connected to an optical fibre 3.

In an actual embodiment, the generating unit 2 is able to generate a first laser beam within the optical fibre 3 having a power in the order of 6 kW and a beam quality corresponding to a BPP value in the range of 50 mm.mrad.

Naturally, the configuration of the generating unit 2 which is diagrammatically shown in FIG. 1, and visible at an enlarged scale also in FIG. 3, is provided herein purely by way of example, while it is well understood by the skilled men in the art that this generating unit can be made according to any of the configurations of presently known diode laser sources.

Figure 2:
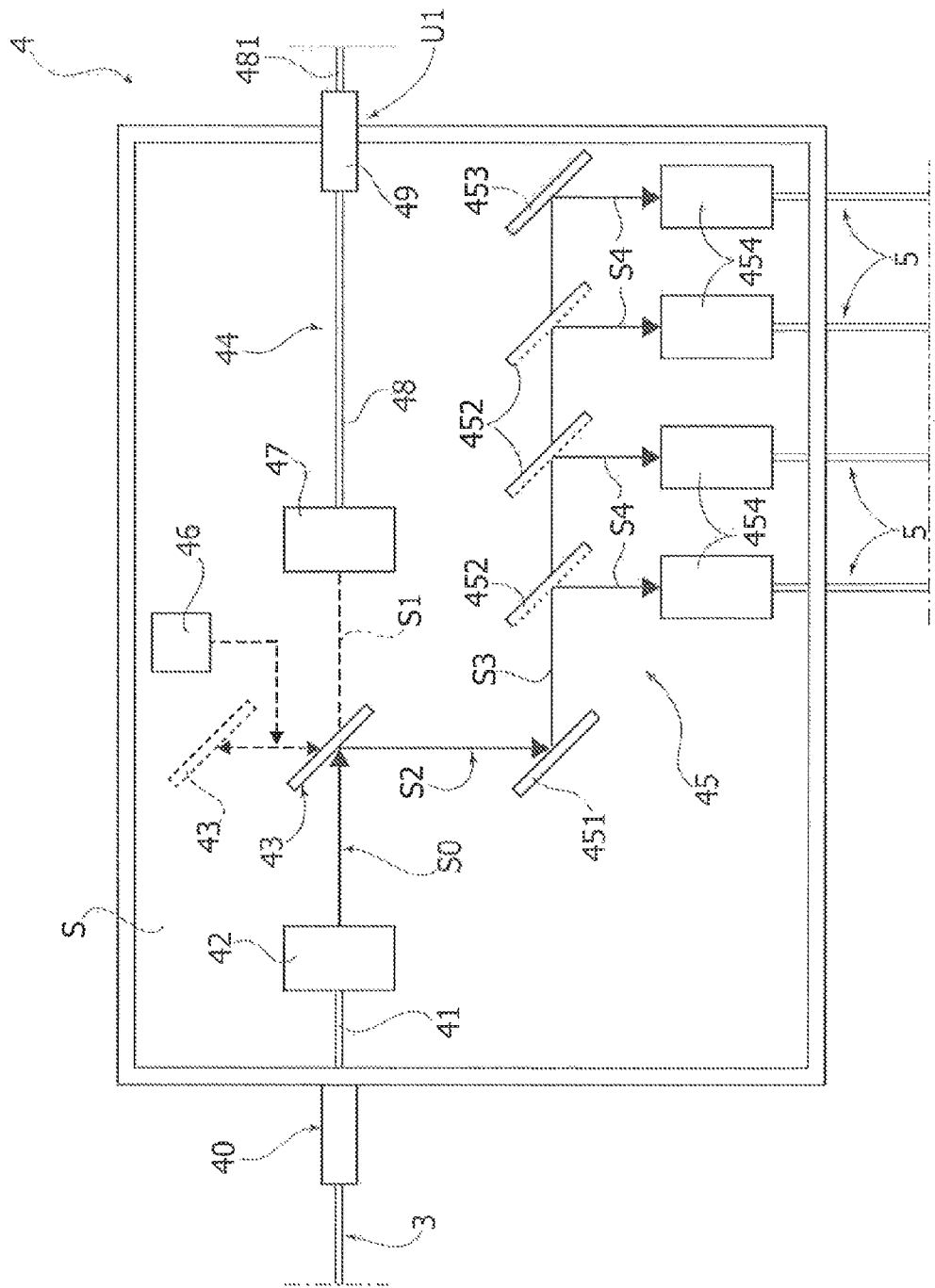
FIG. 2 is an enlarged portion of FIG. 1.

Downstream of the generating unit 2, the laser source 1 according to the present invention comprises a single laser beam shifting and addressing optical unit 4. With reference also to FIG. 2, unit 4 comprises an inlet constituted by a connector 40 to which the optical fibre 3 coming from the generating unit 2 is connected. Connector 40 connects optical fibre 3 to an optical fibre 41 which is at the inlet of unit 4. An optical interface 42, of any known type, transmits the laser beam coming from the generating unit 2 through the optical fibres 3 and 41 within a free space S provided inside the casing of unit 4, in which the laser beam freely propagates.

Within space S at the inside of unit 4 there is arranged an optical path selector device, which in the example illustrated herein is constituted by a mirror 43. In the illustrated example, mirror 43 is movable parallel to itself between a first operative position (shown by dotted line in FIGS. 1, 2) and a second operative position (shown by undotted line).

In the first operative position of mirror 43, this mirror does not intercept the laser beam coming from the generating unit, so that the laser beam can proceed freely towards a first optical line, generally indicated by reference 44, which ends at a first outlet U1 (see FIG. 1) of the laser source according to the invention. In its second operative position, mirror 43 intercepts the laser beam coming from the generating unit and reflects the same towards a second optical line, generally indicated by reference 45.

As already indicated in the foregoing, as an alternative to the arrangement which is shown diagrammatically herein for mirror 43, it is possible to provide an arrangement in which the mirror is simply caused to oscillate between a first operative position and a second operative position, so that in both these positions the mirror intercepts the laser beam coming from the generating unit and reflects the beam in the direction of two different optical lines.

Again with reference to FIG. 2, numeral 46 designates an actuator of any known type, preferably an electrically controlled actuator, adapted to drive the movement of mirror 43 between its two operative positions. When the mirror 43 is in its first operative position (shown by dotted line) in which it does not intercept the laser beam coming from the generating unit along a direction S0, this beam proceeds further within free space S along a direction S1 (constituting the extension of direction S0) until it enters into an optical interface 47, through which the laser beam is guided into an optical fibre 48. The optical fibre 48 ends at a connector 49 through which it is connected to another optical fibre 481 which ends at a connector 482 (see FIG. 1) which constitutes the first outlet U1 of the laser source 1 according to the present invention.

Again with reference to FIG. 2, when mirror 43 is in its second operative position (shown by undotted line) the laser beam coming from the generating unit along direction S0 hits mirror 43 and is then reflected along a direction S2 towards the second optical line 45.

In the case of the specific embodiment shown herein by way of example, the second optical line 45 comprises a fixed mirror 451 which reflects the laser beam coming along direction S2 into a direction S3. The laser beam which proceeds along direction S3 meets in sequence a plurality of fixed semi-reflecting mirrors 452 and a terminal fixed mirror 453 which is totally reflective. The semi-reflective mirrors 452 are configured in such a way that the laser beam which hits them is in part reflected into a direction S4 and in part proceeds beyond the mirror, along the direction S3. The terminal mirror 453 reflects the portion of light which has passed beyond all the semi-reflective mirrors 452. The beam portions reflected along directions S4 are guided through respective optical interfaces 454 into a plurality of optical fibres 5 at the outlet of unit 4.

With reference again to FIG. 1, the optical fibres 5 lead the laser light to the inlets of a plurality of amplifier modules 60 of an optical amplification unit 6. Each of the amplifier modules 60 has a configuration of the type diagrammatically shown in FIG. 4, which is known per se, comprising "active" optical fibres 61 where particles of active materials (ytterbium in the specific case illustrated herein) are dispersed, which have the ability of amplifying the laser source by exploiting the principle of stimulated emission.

Also according to a technique known per se, the active optical fibres 61 extend between two Bragg reticules 62, 63 arranged at the input and at the output of each module 60 and respectively connected to the inlet optical fibre 5 and an outlet optical fibre 64. The optical fibres 64 merge into an optical fibre combinator 65 whose outlet is connected through an optical fibre 66, a connector 67 and another optical fibre 68 (see FIG. 1) to a connector 69 constituting a second outlet U2 of the laser source 1 according to the invention.

The active optical fibres 61 of the amplifier modules 60 are optically pumped with laser light coming from unit 4 and derived from the diode laser sources 20 and give rise to a laser beam at the second outlet U2 having characteristics which are different with respect to the laser beam made available at the first outlet U1. In particular, the passage through the active fibres 61 implies a loss of power (such as in the order of 30% approximately), but increases the beam quality, i.e. the ability of the beam to be focused into a very small spot. In the actual exemplary embodiment, the laser beam available at the outlet U2 has a power of 4 kW and a BPP value in the order of 3 mm.mrad.

As already indicated, in the foregoing description and in the annexed drawings the details of construction relating to the illustrated components have not been provided, since they can be made in any known way and the deletion from the drawings render the latter simpler and easier to understand.

According to a technique which also is known per se, all the functions of the laser source are controlled by an electronic control unit (not shown in FIGS. 1-4) to which a human-machine interface of any known type is associated.

Figure 5:
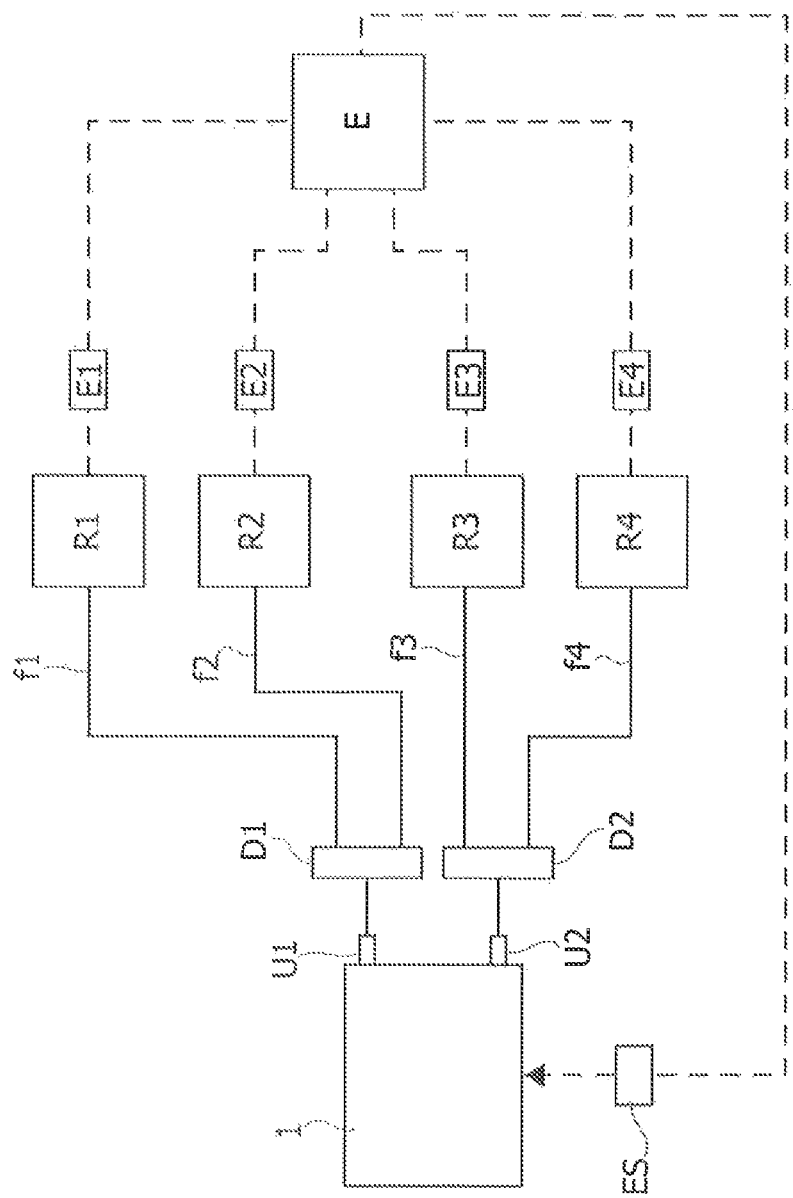
FIG. 5 is a schematic diagram of an example of an industrial plant using a single laser source.

FIG. 5 diagrammatically shows an example of an industrial plant making use of a laser source according to the invention. The illustrated example refers to the case of a plant for production of motor-vehicles, comprising a plurality of laser processing cells or stations R1, R2, R3, R4. For example, the plant comprises a station R1 in which a laser brazing operation is performed (a typical case is that of the operation for connecting a roof to a body of a motor-vehicle), a station R2 where a laser welding operation is performed on a component (such as a structure of a motor-vehicle door), a station R3 where a laser cutting operation is performed, such as an operation for forming an aperture in a wall of the motor-vehicle body, and a station R4 where a laser remote welding operation is performed, i.e. a welding operation where the laser head is kept spaced away from the welding area.

At each processing station there is provided a processing equipment making use of a laser beam. For example, the equipment may comprise one or more multi-axis manipulating robots, each provided with a laser head connected by an optical fibre to the laser source. Also by way of example, to each cell or station there is associated an electronic control unit E1, E2, E3, E4. A supervisor electronic unit E communicates with the electronic units E1, E2, E3, E4.

Brazing, welding, cutting, remote welding processes imply the use of a laser beam with increasing quality (the lower quality being required for brazing and welding, whereas the higher quality is required for cutting and remote welding).

In the plant of FIG. 5 there is illustrated a laser source according to the invention which has been described above, with the two outlets U1, U2 connected, by means of optical distributors D1, D2 of any known type to optical fibres f1, f2, f3, f4 which transmit a respective laser beam to the equipment provided at the respective processing station or cell.

An electronic unit ES for controlling the selector device 43 of the laser source 1 activates either outlet U1 or outlet U2 of source 1 based on signals coming from supervisor E, so as to perform operations at cells R1, R2 or at cells R3, R4.

Figure 6:
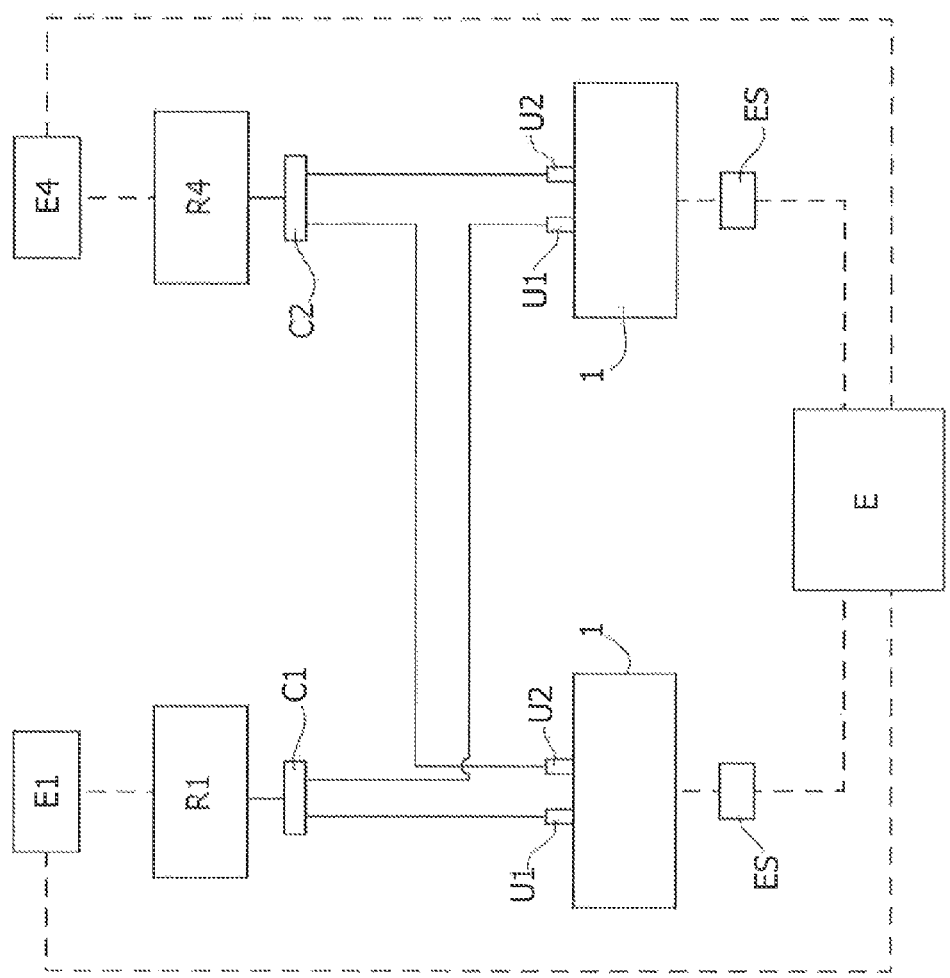
FIG. 6 is a schematic diagram of an alternate example of an industrial plant using two laser sources according to the invention.

Still more advantageously, two sources 1 according to the invention may be provided one of which, for example, is dedicated to one or more cells R1, R2 and the other one being dedicated to one or more cells R3, R4. This solution is diagrammatically shown in FIG. 6, where two sources 1 according to the invention each have one of the two outlets U1, U2 connected to a cell R1 and the other one connected to a cell R4. The optical fibre at the inlet of each cell is connected to two optical fibres coming from two different sources by means of three-ways connectors C1, C2.

Supervisor E controls the electronic unit ES of the sources so that normally the laser source on the left side has its outlet U1 activated for supplying cell R1, whereas the other source 1 has its outlet U2 activated for supplying cell R4 with a laser beam of a higher quality.

However, in the case of failure of one source, the other source can be temporarily used for supplying the cell whose source has a failure, after shifting the respective selector. This can be useful for example when a failure on the source of cell R4 justifies an interruption in the process at cell R1 in order to use the source of R1 as a back-up source for R4.

The illustrated diagrams are purely given by way of example, the configuration and arrangement of the cells and the associated laser sources being clearly variable at will, according to the needs of the specific applications.

The source according to the invention can be also associated to a single processing cell for transmitting laser beams of different characteristics to different laser devices provided at the same cell, in order to perform different laser operations within the same cell.

Naturally, while the principle of the invention remains the same, the details of construction and the embodiments may widely vary with respect to what has been described and illustrated purely by way of example, without departing from the scope of the present invention.

The invention claimed is:

1. A laser source (1), for use particularly for industrial processes, comprising:
   a laser beam generating unit (2), including one or more diode laser sources (20), for generating a first laser beam at a generating unit output;
   an optical amplification unit (6) including a plurality of amplifier modules (60) arranged in parallel and having respective inlets (5) supplied by a second optical line (45), the plurality of amplifier modules further having respective outlets connected to optical lines (64) all converging towards a second outlet (U2), the plurality of amplifier modules adapted to be pumped with laser light derived from said first laser beam emitted by said generating unit (2) and to emit a second laser beam at the second outlet (U2) which is characterized by a higher beam quality and a lower power value with respect to said first laser beam at an output from said generating unit (2); and
   a laser beam shifting and addressing optical unit (4), interposed between said generating unit (2) and said optical amplification unit (6), said laser beam shifting and addressing optical unit (4) including:
   an inlet (40) for receiving said first laser beam coming from said generating unit (2);
   a first optical line (44) for forwarding said first laser beam towards a first outlet (U1) of said laser source (1);
   the second optical line (45) for forwarding said first laser beam towards said plurality of amplifier modules (60) of said optical amplification unit (6); and
   an optical path selector device (43) interposed between said inlet (40) and said first and second optical lines (44, 45) for directing said first laser beam coming from said generating unit (2) selectively towards:
   said first optical line (44), so as to generate the emission of the first laser beam having a relatively higher power and a relatively lower quality at said first outlet (U1) of said laser source (1),
   or towards:
   said second optical line (45) so as to generate the emission of the second laser beam having a relatively lower power and a relatively higher quality at the second outlet (U2) of said laser source (1).

2. The laser source according to claim 1, characterized in that said at least one of said plurality of amplifier modules (60) comprises at least one optical fibre (61) including active material adapted to amplify the first laser beam which enters into said at least one amplifier module (60) and which comes from said generating unit (2) through said second optical line (45) of said shifting and addressing optical unit (4).

3. The laser source according to claim 1, characterized in that said optical path selector device comprises a mirror (43) movable between a first operative position and a second operative position, corresponding respectively to directing the first laser beam coming from said generating unit (2) towards said first optical line (44) or towards said second optical line (45).

4. The laser source according to claim 3, characterized in that in said first operative position said mirror (43) does not intercept said first laser beam coming from said generating unit (2) and that in said second operative position said mirror (43) intercepts said first laser beam coming from said generating unit.

5. The laser source according to claim 4, characterized in that in said first operative position said mirror (43) enables the first laser beam coming from said generating unit (2) to proceed in the direction of said first optical line (44), and that in said second operative position said mirror (43) reflects the first laser beam coming from said generating unit (2) in the direction of said second optical line (45).

6. The laser source according to claim 3, characterized in that in said first operative position and in said second operative position said mirror (43) is oriented differently, so as to reflect said first laser beam coming from said generating unit (2) respectively towards said first optical line (44) or towards said second optical line (45).

7. The laser source according to claim 1, characterized in that the outlet of said generating unit (2) and the inlet of said shifting and addressing optical unit (4) are connected to each other by an optical fibre (3).

8. The laser source according to claim 1, characterized in that said shifting and addressing optical unit (4) comprises a free space (S) for propagation of the first laser beam, where said optical path selector device is interposed.

9. The laser source according to claim 8, characterized in that said shifting and addressing optical unit comprises an inlet optical fibre (41), connected to the inlet of said shifting and addressing optical unit, and a first optical interface (42) for receiving said first laser beam from said inlet optical fibre (41) and for transmitting said first laser beam within said free space (S) where said optical path selector device (43) is interposed.

10. The laser source according to claim 9, characterized in that said shifting and addressing optical unit (4) comprises a second optical interface (47) arranged along said first optical line (44), for receiving said first laser beam which propagates within said free space (S) and for directing the first laser beam into an outlet optical fibre (44) connected to said first outlet (U1) of the laser source (1).

11. The laser source according to claim 10, characterized in that said shifting and addressing optical unit (4) comprises at least a third optical interface (454) arranged along said second optical line (45) for receiving said first laser beam which propagates within said free space (S) and for directing the first laser beam into at least one outlet optical fibre (5) connected to said at least one amplifier module (60) of said optical amplification unit (6).

12. The laser source according to claim 11, wherein said outlet optical fibre (5) comprises a plurality of outlet optical fibres (5) and wherein said third optical interface (454) comprises a plurality of optical interfaces (454), each respective optical interface (454) is connected by a respective outlet optical fibre (5) to a respective of said plurality of amplifier modules (60).

13. The laser source according to claim 12, characterized in that within said free space (S) of said shifting and addressing optical unit (4) further comprises an array of semi-reflecting mirrors (452) for subdividing the first laser beam directed along said second optical line (45) into a plurality of laser beams directed towards respective of said plurality of amplifier modules (60).

14. The laser source according to claim 13, characterized in that outlets of said plurality of amplifier modules (60) are connected to respective optical fibres (64) merging into an optical combinator device (65) connected to said second outlet (U2) of the laser source (1).

15. A method of controlling at least a first and a second laser processing station in an industrial plant, the industrial plant having a first and a second laser source according to claim 1, each source having a first outlet for transmission of a first laser beam and a second outlet for transmission of a second laser beam, the method comprising:
  connecting the first outlet of the first laser source to the first laser processing station and the second outlet of the first laser source to the second laser processing station;
  connecting the second outlet of the second laser source to the second processing station and the first outlet of the second laser source to the first laser processing station;
  on a failure of one of the first or second laser sources to supply a laser through the respective first or second outlets to the respective first or second laser processing station, energizing the other of the first or second laser sources to replace the supply of the failed laser.

16. An industrial plant comprising:
  at least one first laser processing device, a laser processing cell or a laser processing station requiring a first laser beam, the first laser processing cell or a laser processing station operable to selectively emit a first operation signal when there is a demand for the first laser beam;
  at least one second laser processing device, a laser processing cell or a laser processing station requiring a second laser beam, the second laser processing cell or a laser processing station operable to selectively emit a second operation signal when there is a demand for the second laser beam;
  a first laser source comprising:
    a generating unit operable to generate a first laser having a relatively higher power and a relatively lower quality;
    a shifting and addressing optical unit in optical communication with the generating unit, the shifting and addressing optical unit further comprising:
      a first optical path having a first outlet for transmission of the first laser;
      a second optical path different than the first optical path having a second outlet, the second path operable to generate a second laser having a relatively lower power and a relatively higher quality at the second outlet;
      an optical path selector device having a first position and a second position for selectively transmitting the first laser to the respective first or the second optical path;
    an optical amplification unit in communication with the shifting addressing optical unit second optical path and the second outlet; and
  an electronic control unit in electronic communication with the optical path selector device and the at least one first and second laser processing device, laser processing cell or laser processing stations, the electronic control unit operable to selectively position the optical path selector device to the first or the second position to selectively transmit the first or the second laser to the respective at least one first or second laser processing device, laser processing cell or laser processing station based on the first and the second operation signals.

17. The industrial plant of claim 16 wherein the first laser is of relatively higher power and relatively lower quality and the second laser is of relatively lower power and relatively higher quality than the first laser.

18. The industrial plant of claim 16 further comprising:
  a second laser source in communication with the at least one first and second laser processing device, laser processing cell and laser processing stations and the electronic control unit, the second laser source comprising:
    a generating unit operable to generate a first laser having a relatively higher power and a relatively lower quality;
    a shifting and addressing optical unit in optical communication with the generating unit, the shifting and addressing optical unit further comprising:
      a first optical path having a first outlet for transmission of the first laser;
      a second optical path different than the first optical path having a second outlet, the second path operable to generate a second laser having a relatively lower power and a relatively higher quality at the second outlet;
      an optical path selector device having a first position and a second position for selectively transmitting the first laser to the respective first or the second optical path; and
    an optical amplification unit in communication with the shifting addressing optical unit second optical path and the second outlet.

19. The industrial plant of claim 18 wherein the electronic control unit is operable to direct one of the first and the second laser sources to provide the respective first or second laser to one of the at least one first or second laser processing device, laser processing cell or laser processing stations on a failure of the other of the first or the second laser sources.

* * * * *